(12) United States Patent
Dimov

(10) Patent No.: US 11,429,655 B2
(45) Date of Patent: Aug. 30, 2022

(54) ITERATIVE ONTOLOGY LEARNING

(71) Applicant: SAP SE, Walldorf (DE)

(72) Inventor: Stefan Dimov, Mountain View, CA (US)

(73) Assignee: SAP SE, Walldorf (DE)

( * ) Notice: Subject to any disclaimer, the term of this patent is extended or adjusted under 35 U.S.C. 154(b) by 448 days.

(21) Appl. No.: 16/702,425

(22) Filed: Dec. 3, 2019

(65) Prior Publication Data
US 2021/0165815 A1 Jun. 3, 2021

(51) Int. Cl.
*G06F 16/36* (2019.01)
*G06F 40/289* (2020.01)
*G06F 16/903* (2019.01)

(52) U.S. Cl.
CPC ...... *G06F 16/367* (2019.01); *G06F 16/90335* (2019.01); *G06F 40/289* (2020.01)

(58) Field of Classification Search
CPC . G06F 16/367; G06F 16/90335; G06F 16/289
See application file for complete search history.

(56) References Cited

U.S. PATENT DOCUMENTS

2003/0171914 A1* 9/2003 Jung ............... G06F 16/3338 704/7
2004/0210435 A1* 10/2004 Oshima ............ G06F 16/2458 704/10

* cited by examiner

*Primary Examiner* — Loc Tran
(74) *Attorney, Agent, or Firm* — Mintz Levin Cohn Ferris Glovsky and Popeo, P.C.

(57) ABSTRACT

A method may include determining whether a first item description matches at least a second item description stored in a database. If the first item description matches the second item description, an ontology of the database may be updated by storing, in the database, the first item description including a first association between the first item description and a first headword associated with the second item description. Alternatively, if the first item description does not match any item descriptions in the database, a second headword for the first item description may be determined based on user inputs. Moreover, the ontology of the database may be updated by storing, in the database, the first item description including a second association between the first item description and the second headword. Related systems and articles of manufacture, including computer program products, are also provided.

20 Claims, 6 Drawing Sheets

| Word | Prominence Score |
|---|---|
| Scandinavian | 1 |
| Walnut | 1 |
| Dining | 3 |
| Chair | 100 |

FIG. 3A

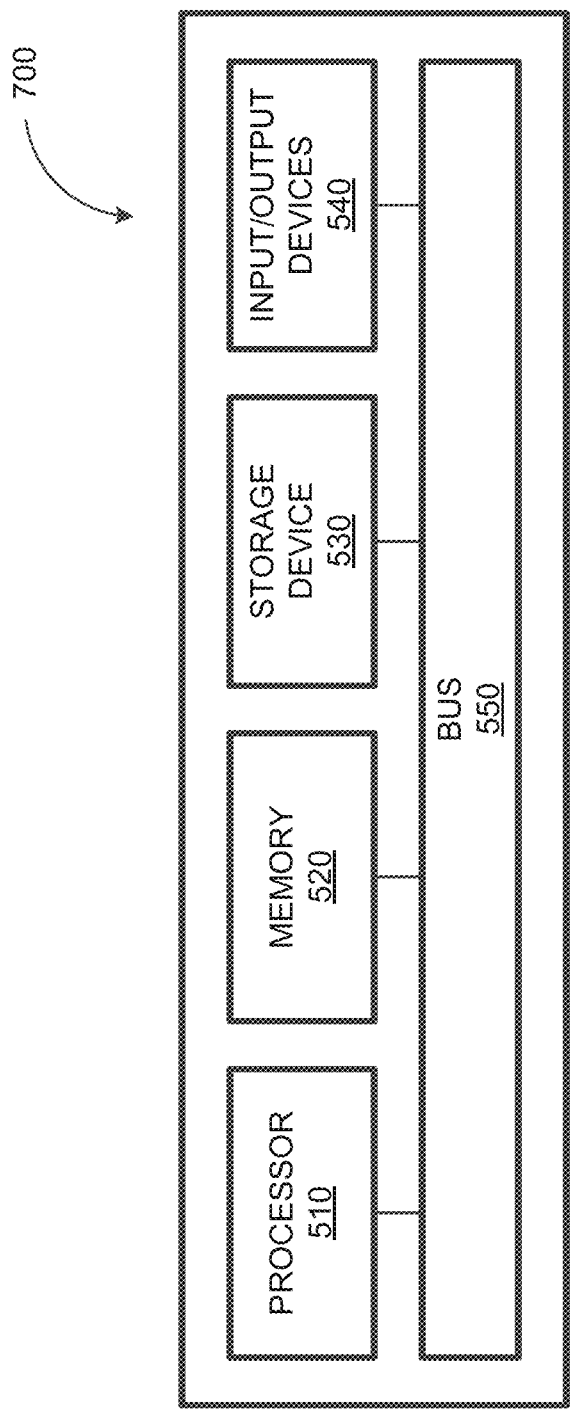

ITERATIVE ONTOLOGY LEARNING

TECHNICAL FIELD

The subject matter described herein relates generally to data processing and more specifically to learning an ontology for categorizing data stored in a database.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program items, are provided for ontology learning. In one aspect, there is provided a system. The system may include at least one data processor and at least one memory. The at least one memory may store instructions that cause operations when executed by the at least one data processor. The operations may include: receiving a first item description; determining whether the first item description matches at least a second item description stored in a database; in response to the first item description matching the second item description, updating an ontology of the database by at least storing, in the database, the first item description including a first association between the first item description and a first headword associated with the second item description; in response to the first item description not matching any item descriptions in the database, determining, based at least on one or more user inputs, a second headword for the first item description; and updating the ontology of the database by at least storing, in the database, the first item description including a second association between the first item description and the second headword.

In some variations, one or more features disclosed herein including the following features can optionally be included in any feasible combination. The first item description may be determined to match the second item description based at least on a relevance score of the second item description. The relevance score of the second item description may correspond to a prominence score of one or more words in the second item description that are also present in the first item description. The prominence score of each of the one or more words may correspond to a relative significance of each of the one or more words.

In some variations, the first item description may be determined to match the second item description based at least on whether the relevance score exceeds a threshold value. The threshold value may be equal to or greater than a prominence score of assigned to the first headword included in the second item description.

In some variations, the first headword and the second headword may each be a word having a greatest significance by at least providing a basic description of a corresponding item.

In some variations, the database may store a plurality of item descriptions including the first item description and the second item description. The ontology of the database may categorize, based at least on the first headword and/or the second headword, the plurality of item descriptions.

In some variations, the first item description may be assigned the first headword of the second item description in response to the first item description matching the second item description.

In some variations, the one or more user inputs may identify the second headword as a headword associated with the first item description.

In some variations, a search phrase may be received. In response to receiving the search phrase, the database may be queried to retrieve, based at least on the ontology of the database, one or more item descriptions matching the search phrase, the one or more item descriptions may include the first item description based at least on a first relevance score of the first item description exceeding a threshold value. The first relevance score of the first item description may correspond to a prominence score of each of one or more words in the first item description that are also present in the search phrase. The one or more item descriptions may further exclude the second item description based at least on a second relevance score of the second item description not exceeding the threshold value.

In some variations, the database may be a relational database, and wherein the first item description is determined to match at least the second item description by at least querying the database.

In some variations, the first item description may be preprocessed by at least eliminating variations of one or more words in the first item description.

In some variations, the first item description may be preprocessed by at least replacing and/or supplementing a first word in the search phrase with a second word, and wherein the second word comprises a synonym and/or a hypernym of the first word.

In some variations, the first item description may be preprocessed by at least replacing an incorrect word in the first item description with a correct word, and wherein the correct word is identified by at least applying, to the incorrect word, a distance algorithm.

In another aspect, there is provided a method for ontology learning. The method may include: receiving a first item description; determining whether the first item description matches at least a second item description stored in a database; in response to the first item description matching the second item description, updating an ontology of the database by at least storing, in the database, the first item description including a first association between the first item description and a first headword associated with the second item description; in response to the first item description not matching any item descriptions in the database, determining, based at least on one or more user inputs, a second headword for the first item description; and updating the ontology of the database by at least storing, in the database, the first item description including a second association between the first item description and the second headword.

In some variations, one or more features disclosed herein including the following features can optionally be included in any feasible combination. The first item description may be determined to match the second item description based at least on a relevance score of the second item description. The relevance score of the second item description may correspond to a prominence score of one or more words in the second item description that are also present in the first item description. The prominence score of each of the one or more words may correspond to a relative significance of each of the one or more words.

In some variations, the first headword and the second headword may each be a word having a greatest significance by at least providing a basic description of a corresponding item.

In some variations, the first item description may be assigned the first headword of the second item description in response to the first item description matching the second item description.

In some variations, the one or more user inputs may identify the second headword as a headword associated with the first item description.

In another aspect, there is provided a computer program product including a non-transitory computer-readable medium. The non-transitory computer-readable medium may store instructions that causes operations when executed by at least one data processor. The operations may include: receiving a first item description; determining whether the first item description matches at least a second item description stored in a database; in response to the first item description matching the second item description, updating an ontology of the database by at least storing, in the database, the first item description including a first association between the first item description and a first headword associated with the second item description; in response to the first item description not matching any item descriptions in the database, determining, based at least on one or more user inputs, a second headword for the first item description; and updating the ontology of the database by at least storing, in the database, the first item description including a second association between the first item description and the second headword.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to learning an ontology for categorizing data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts a table illustrating an example of an item description, in accordance with some example embodiments;

FIG. 5 depicts a block diagram illustrating a computing system, in accordance with some example embodiments.

When practical, similar reference numbers denote similar structures, features, or elements.

DETAILED DESCRIPTION

Figure 1:
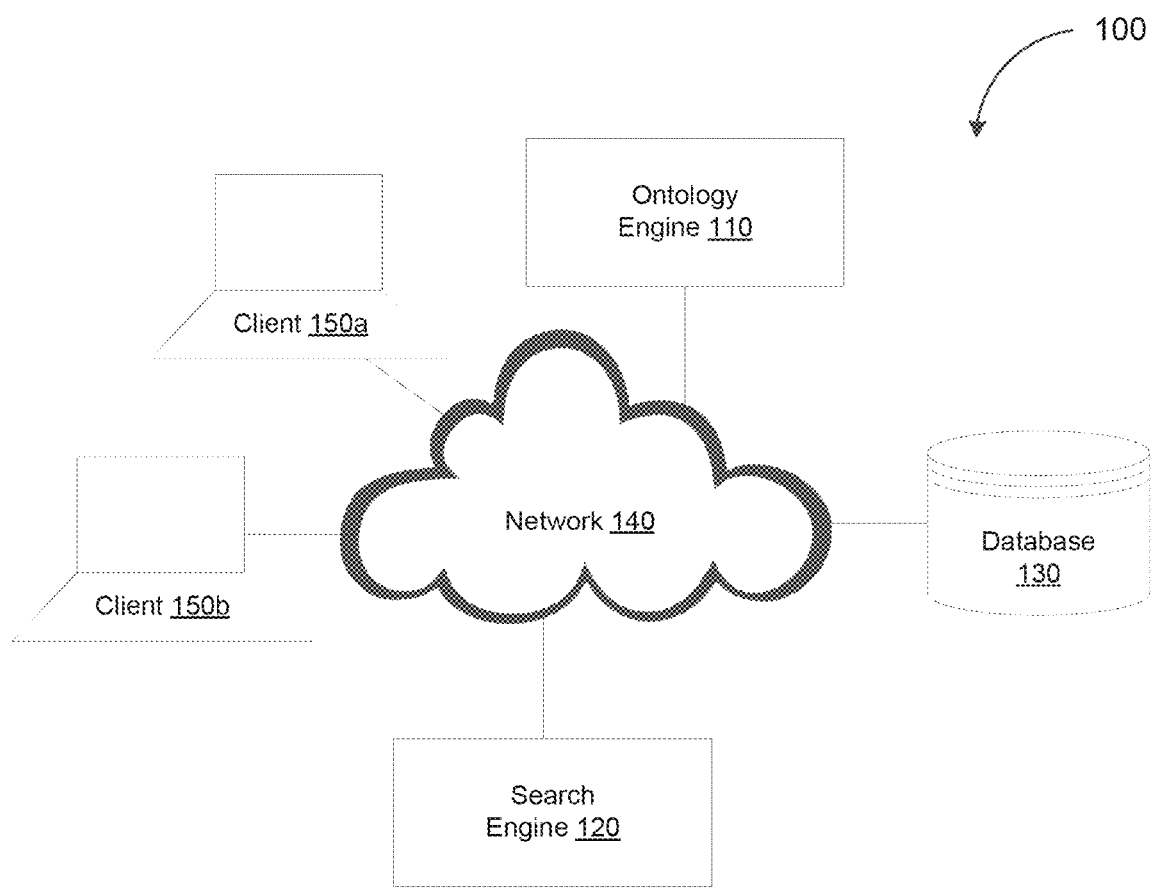
FIG. 1 depicts a system diagram illustrating an example of a database system, in accordance with some example embodiments.

The electronic data records stored in a database may be associated with an ontology defining one or more categories, properties, and relationships reflected in the structure of the corresponding data. For example, data may be associated with an ontology including a plurality of item descriptions, each of which being associated with a headword. The headword in an item description may be the most significant word providing, for example, a basic description of a corresponding item that identifies the corresponding item whereas other words in the item description may be less significant words providing one or more attributes of the item. By tagging the headword of the item, the ontology may enable subsequent searches in which a search phrase describing an item may be matched to one or more item descriptions in a database. For instance, the search phrase may be matched to an item description if one or more words in the item description match one or more words in the search phrase. In particular, a match between the search phrase and the item description may require the head word in the item description to match the head word in the search phrase. Nevertheless, updating the ontology in order to accommodate the constant addition of new item descriptions to the database may be an onerous task requiring tremendous resources. As such, in some example embodiments, an ontology engine may be configured to learn the ontology of a data iteratively.

In some example embodiments, the ontology engine may learn the ontology of the data including by updating the ontology of the data when a new item description is added to the database. For example, in response to receiving a new item description, the ontology engine may determine whether the new item description match one or more existing item descriptions stored in the database. The ontology engine may determine that the new item description matches an existing item description, for example, when one or more words in the new item description including the head word match one or more words in the existing item description including the head word. In response to the match between the new item description and the existing item description, the ontology engine maytag the headword of the new item description with the headword of the existing item description. Alternatively, if the ontology engine fails to match the new item description to an existing item description stored in the database, the ontology engine may determine, based at least on inputs from one or more users, a headword for the new item description. The headword may be a new headword or an existing headword that is already part of the ontology of the database. The ontology engine may update the ontology of the database by at least associating the new item description with the headword determined for the new item description.

In some example embodiments, the ontology engine may determine whether the new item description matches an existing item description in the database based on the relevance of the matching words that appear in the new item description and in the existing item description. For example, each word in the existing item description may be associated with a prominence score indicative of the significance of that word relative to other words appearing in the item description. It should be appreciated that as used herein, the significance of a word included in the description of an item may correspond to how definitively the item is able to be identified based on the word alone. The most significant word in an item description may therefore provide a definitive identification of a corresponding item. For example, the most significant word in the item description "Scandinavian cherry dining chair" may be the word "chair," which definitively identifies the item associated with the item description. Contrastingly, the other words included in the item description "Scandinavian cherry dining chair" may provide one or more attributes for the item but the item is not identifiable based on the words "Scandinavian," "cherry," or "dining" alone.

To determine whether the new item description matches the existing item description, the ontology engine may determine a relevance score corresponding to a combined prominence score of the words in the existing item description that match a word in the new item description. The ontology engine may determine that the existing item description matches the new item description if the relevance score of the existing item description exceeds a threshold value. This threshold value may be adjusted, for example, to be equal to or greater than the prominence score assigned to headword associated with the existing item description, thereby ensuring that the headword of the existing item description must appear in the new item description.

In some example embodiments, a search engine may be configured to identify one or more items that match a search phrase based on the relevance of the matching words that appear in the search phrase and in each of a plurality of item descriptions stored in a database. For example, the search engine may respond to the receipt of a search phrase from a user by at least querying the database to retrieve, from the database, one or more item descriptions matching the search phrase. Each of the matching item description retrieved from the database may be associated with a relevance score corresponding to a combined prominence score of the words in the item description that match a word in the search phrase. The search engine may determine that an item description matches the search phrase if the relevance score of the item description exceeds a threshold value. This threshold value may be adjusted, for example, to be equal to or greater than the prominence score assigned to headwords, thereby ensuring that the headword of an item description must appear in the search phrase in order for the item description to be selected as a matching item description. Alternatively and/or additionally, the search engine may select a quantity of item descriptions having the highest relevance scores. Accordingly, even though a first item description may include a larger quantity of matching words than a second item description, the search engine may nevertheless determine that the second item description is a match for the search phrase if the second item description has a higher relevance score than the first item description.

FIG. 1 depicts a system diagram illustrating an example of a database system 100, in accordance with some example embodiments. Referring to FIG. 1, the database system 100 may include an ontology engine 110, a search engine 120, and a database 130. The ontology engine 110, the search engine 120, and the database 130 may be communicatively coupled via a network 140. Moreover, FIG. 1 shows the ontology engine 110 and the search engine 120 as being communicatively coupled, via the network 140, with a first client 150a and a second client 150b. Each of the first client 150a and the second client 150b may a processor and memory based device including, for example, a cellular phone, smart phone, a tablet, a laptop computer, a desktop, a workstation, and/or the like. The network 140 may be a wired and/or wireless network including, for example, a public land mobile network (PLMN), a local area network (LAN), a wide area network (WAN), a virtual local area network (VLAN), the Internet, and/or the like. The database 130 may be any type of database including, for example, a graph database, an in-memory database, a relational database, a non-SQL (NoSQL) database, and/or the like.

The database 130 may store a plurality of item descriptions, each of which corresponding to an item. A single item description include one or more words, each of which being assigned a prominence score corresponding to the significance of that word relative to other words in the same item description. For instance, an item description may include at least one headword, which provide a basic description of the corresponding item and is therefore the highest prominence score relative to other words in the item description that provide the attributes of the item. Moreover, the prominence score assigned to a first word relating to a first attribute of the item may be higher (or lower) than the prominence score assigned to a second word relating to a second attribute of the item depending on the relative importance of the first attribute and the second attribute.

The database 130 may be associated with an ontology categorizing the item descriptions stored in the database 130 at least by associating each item description with a headword. As noted, the headword in an item description may be the most significant word providing a basic description of a corresponding item. By associating each item description with a corresponding headword, the ontology may enable subsequent searches in which a search phrase describing an item may be matched to one or more item descriptions in the database by at least matching words in the search phrase to headwords in the item descriptions.

The ontology of the database 130 may require constant updates in order to reflect the addition of new item descriptions to the database 130. Accordingly, in some example embodiments, the ontology engine 110 may be configured to learn the ontology of the database 130 iteratively including by updating the ontology of the database 130 in response to the addition of a new item description to the database 130.

For example, the ontology engine 110 may receive, from the first client 150*a*, a first item description "Scandinavian cherry dining chair." In response to receiving the first item description from the first client 150*a*, the ontology engine 110 may determine whether the first item description match one or more item descriptions already stored in the database 130. If the ontology engine 110 determines that the first item description matches a second item description "Scandinavian walnut dining chair" stored in the database 130, the ontology engine 110 may categorize the first item description by associating the first item description with a headword of the second item description. For example, the ontology engine 110 may determine that the first item description "Scandinavian cherry dining chair" matches the second item description "Scandinavian walnut dining chair" associated with the headword "chair." As such, the ontology engine 110 may update the ontology of the database 130 by at least categorizing the first item description "Scandinavian cherry dining chair" with the headword "chair" of the second item description "Scandinavian walnut dining chair."

Alternatively, if the ontology engine 110 fails to match the first item description to one or more item descriptions already stored in the database 130, the ontology engine 110 may determine, based at least on one or more inputs from a user at the second client 150*b*, a headword for the first item description. For example, the ontology engine 110 may receive, from the second client 150*b*, one or more inputs identifying the headword associated with the first item description. This headword may be a new headword or an existing headword that is already part of the ontology of the database 130. The ontology engine 110 may update the ontology of the database 130 by at least associating the first item description with the headword determined for the first item description. For instance, if the ontology engine 110 is unable to match the first item description "Scandinavian cherry dining chair" to any item descriptions already stored in the database 130, the ontology engine 110 may determine a headword for the first item description based on one or more inputs received from the user at the second client 150*b*. Accordingly, if the one or more inputs received from the second client 150*b* identifies "chair" as the headword of the first item description "Scandinavian cherry dining chair," the ontology engine 110 may update the ontology of the database 130 by at least associating the first item description "Scandinavian cherry dining chair" with the headword "chair."

In some example embodiments, the ontology engine 110 may determine whether the first item description matches the second item description already stored in the database based at least on the relevance of the matching words appearing in the first item description and the second item description. For example, the ontology engine 110 may determine, based at least on the relevance score of the second item description, whether the first item description matches the second item description. In order to determine whether the first item description matches the second item description, the ontology engine 110 may query the database 130 to retrieve one or more item descriptions matching the first item description. The matching item descriptions retrieved from the database 130 may be sorted based at least on a relevance score for each of the matching item description.

In some example embodiments, prior to querying the database 130 to retrieve one or more item descriptions that match the first item description, the ontology engine 110 may preprocess the first item description. For example, the preprocessing of the first item description may include tokenizing the first item description into individual words. The first item description may also be cleaned to remove stop words, numerical digits, non-alphabet symbols, and/or the like. Alternatively and/or additionally, the preprocessing of the first item description may include supplementing and/or replacing one or more words from the first item description with synonyms and/or hypernyms, which may be more general than the original words. The ontology engine 110 may further stem and/or lemmatize the first item description to eliminate multiple variations (e.g., inflected forms and/or the like) of the same word.

In some example embodiments, the preprocessing of the first item description may further include resolving typographical errors appearing in the search phrase. For example, the ontology engine 110 may encounter an incorrect word in the first item description (e.g., "aple" instead of "apple," "code" instead of "core," and/or the like). In response to the presence of an incorrect word, the ontology engine 110 may identify one or more correct words by at least identifying words that are a threshold distance away from the incorrect word. For instance, the ontology engine 110 may identify the correct words by applying, to an incorrect word, a distance algorithm including, for example, Levenstein distance, and/or the like. The ontology engine 110 may further replace the incorrect words with the correct words before querying the database 130 using the preprocessed first item description. That is, the ontology engine 110 may query the database 130 to retrieve item descriptions that match the preprocessed first item description containing the correct words instead of the original first item description including the incorrect words.

Once the ontology engine 110 preprocesses the first item description, the ontology engine 110 may query the database 130 to retrieve, from the database 130, one or more item descriptions that match the first item description. To further illustrate, Table 1 below depicts an example of a query that the ontology engine 110 may send to the database 130.

TABLE 1

```
CREATE PROCEDURE MATCH_SEMANTICS2(IN phrase_words_json VARCHAR(5000))
READS SQL DATA AS
BEGIN
    DECLARE phrase_words TABLE (WORD VARCHAR(200));
    phrase_words = SELECT DISTINCT WORD
            FROM JSON_TABLE(:phrase_words_json,
                    '$.elements[*]'
                    COLUMNS (WORD VARCHAR(200)
PATH '$'));
    SELECT DISTINCT PA.CNT, HW_CNT,
            HWS,
                CONCAT('|',
                CONCAT(ST.STR,
                CONCAT(',',
                CONCAT(PA.AT, ' | ')))) "JSON"
```

TABLE 1-continued

```
    FROM ( SELECT PROD_ID,
            COUNT(WORD) "HW_CNT",
            STRING_AGG (WORD, ','ORDER BY WORD) HWS,
                CONCAT('"unspsc": "',
                CONCAT(unspsc,
                CONCAT('", "headWord": [',
                CONCAT(STRING_AGG( CONCAT('"',
CONCAT( WORD, '"')), ','ORDER BY WORD), ']')))) "STR"
        FROM PRODUCT_SEMANTICS
        WHERE SEM_TYPE = 'product'
        GROUP BY PROD_ID, UNSPSC) "ST"
        INNER JOIN
    (SELECT PROD_ID, IFNULL(CONCAT('"attributes": [', CONCAT( STRING_AGG
(AGG,
', 'ORDER BY AGG), ']')), '"attributes": [ ]') "AT" , COUNT(PROD_ID) "CNT" FROM
        (SELECT PS.PROD_ID,
            CONCAT(CONCAT('{"', PS.ATTR_NAME), CONCAT('":
"', CONCAT(PS.ATTR_VAL, '"}'))) "AGG"
        FROM (SELECT PROD_ID, PROD_TITLE, COUNT(DISTINCT WORD) "WC"
FROM PRODUCT_SEMANTICS
        WHERE
            WORD IN
                (SELECT WORD FROM :phrase_words)
            AND PROD_ID IN
                (SELECT PROD_ID FROM PRODUCT_SEMANTICS
                WHERE WORD IN
                    (SELECT WORD FROM
:phrase_words)
                AND SEM_TYPE = 'product')
        GROUP BY PROD_ID, PROD_TITLE
        HAVING COUNT (DISTINCT WORD) = (SELECT TOP 1
COUNT (DISTINCT WORD) FROM PRODUCT_SEMANTICS
    WHERE
    WORD IN (SELECT WORD FROM :phrase_words)
    AND PROD_ID IN
        (SELECT PROD_ID FROM PRODUCT_SEMANTICS
        WHERE
            WORD IN (SELECT WORD FROM :phrase_words)
            AND SEM_TYPE = 'product')
GROUP BY PROD_ID
ORDER BY COUNT (DISTINCT WORD) DESC)
        ORDER BY COUNT (DISTINCT WORD) DESC) "PIDS"
            INNER JOIN
            (SELECT PROD_ID,
                (CASE WHEN ATTR_TYPE = 'N' THEN ATTR_NAME
ELSE NULL END) "ATTR_NAME",
                ATTR_VAL,
                WORD
            FROM PRODUCT_SEMANTICS) "PS"
                ON PIDS.PROD_ID = PS.PROD_ID
        WHERE
            PS.WORD IN (SELECT WORD FROM :phrase_words)
        GROUP BY PS.PROD_ID, PS.ATTR_NAME, PS.ATTR_VAL
        ORDER BY PS.PROD_ID)
    GROUP BY PROD_ID
    HAVING COUNT (PROD_ID) >=
        (SELECT MAX (CNT) FROM
        (SELECT COUNT(PROD_ID) "CNT" FROM
            (SELECT DISTINCT PS.PROD_ID
            FROM (SELECT PROD_ID FROM
PRODUCT_SEMANTICS
                WHERE
                    WORD IN
                        (SELECT WORD FROM
:phrase_words)
                    AND PROD_ID IN
                        (SELECT PROD_ID FROM
PRODUCT_SEMANTICS
                        WHERE WORD IN
                            (SELECT
WORD FROM :phrase_words)
                        AND
SEM_TYPE = 'product')
                GROUP BY PROD_ID, PROD_TITLE
                HAVING COUNT(DISTINCT WORD) =
(SELECT TOP 1 COUNT(DISTINCT WORD) FROM PRODUCT_SEMANTICS
        WHERE
            WORD IN (SELECT WORD FROM :phrase_words)
            AND PROD_ID IN
                (SELECT PROD_ID FROM PRODUCT_SEMANTICS
```

TABLE 1-continued

```
            WHERE
                WORD IN (SELECT WORD FROM
:phrase_words)
                AND SEM_TYPE = 'product')
        GROUP BY PROD_ID
        ORDER BY COUNT(DISTINCT WORD) DESC)
                ORDER BY COUNT(DISTINCT WORD)
DESC) "PIDS"
                INNER JOIN
PRODUCT_SEMANTICS "PS"
                ON PIDS.PROD_ID =
PS.PROD_ID
            WHERE
                PS.WORD IN (SELECT WORD FROM
:phrase_words)
                GROUP BY PS.PROD_ID, PS.ATTR_NAME,
PS.ATTR_VAL
                ORDER BY PS.PROD_ID)
        GROUP BY PROD_ID
        ORDER BY CNT DESC))
    ORDER BY CNT DESC) "PA"
    ON ST.PROD_ID = PA.PROD_ID
    ORDER BY PA.CNT DESC, HW_CNT DESC;
END;
```

As noted, the relevance score for an item description may correspond to a combined prominence score of each word in the item description that match a word in the first item description. Meanwhile, the prominence score of a word in an item description may correspond to a significance of that word relative to other words in the same item description. For example, the most significant word in an item description may the headword, which may be one or more words that provide a basic description of a corresponding item. Alternatively and/or additionally, less significant words in the search phrase may relate to attributes of the item. It should be appreciated that the prominence score for the words in an item description may be determined using any technique including, for example, crowd sourcing, machine learning, and/or the like.

In some example embodiments, the relevance score for an item description may correspond to a combined prominence score of the words in the item description that match a word in the first item description. An item description from the database 130 may have a higher relevance score if the first item description includes words that match the more significant words from the item description which, as noted, may be associated with higher prominence scores. By contrast, an item description from the database 130 may have a lower relevance score if the first item description includes words that match less significant words from the item description (e.g., words associated with lesser prominence scores). As such, the ontology engine 110 may query the database 130 to return a certain quantity of matching item descriptions having a highest relevance score (e.g., item descriptions having the top n relevance scores). Alternatively and/or additionally, the ontology engine 110 may query the database 130 to return item descriptions having a relevance score that exceeds a threshold value. For example, the ontology engine 110 may query the database 130 to return item descriptions whose relevance score exceed the prominence score assigned to headwords. In doing so, the ontology engine 110 may ensure that the item descriptions retrieved from the database 130 include headwords that match words appearing in the first item description.

To further illustrate, the ontology engine 110 may receive, from the first client 150a, the first item description "Scandinavian cherry dining chair" for storing at the database 130.

As noted, the ontology engine 110 may preprocess the first item description, for example, by tokenizing, cleaning, stemming, and/or lemmatizing the first item description. The ontology engine 110 may further preprocess the first item description by supplementing and/or replacing one or more words from the first item description with synonyms and/or hypernyms, which may be more general than the original words. For instance, the ontology engine 110 may supplement and/or replace the word "cherry" with the word "wood." It should be appreciated that synonyms and/or hypernyms may be category dependent. For instance, while the word "cherry" may be supplemented and/or replaced with the word "wood" in the furniture category, the same word "cherry" may be supplemented and/or replaced with the words "stone fruit" in the produce and/or food category. Alternatively and/or additionally, the ontology engine 110 may preprocess the search phrase by replacing incorrect words with correct words.

In response to the receiving the first search description "Scandinavian cherry dining chair" from the first client 150a, the ontology engine 110 may query the database 130 to return a list of matching item descriptions, which may be sorted based on a relevance score of each matching item description. For example, the ontology engine 110 may retrieve, from the database 130, the second item description "Scandinavian walnut dining chair." According to some example embodiments, each word in the second item description may be associated with a prominence score. For instance, as table 300 in FIG. 3A shows, for the second search description, a prominence score of 100 may be assigned to the word "chair," a prominence score of 3 may be assigned to the word "dining," and a prominence score of 1 may be assigned to each of the words "walnut" and "Scandinavian." As noted, one or more techniques may be applied to determine the prominence score of a word including, for example, crowd sourcing, machine learning, and/or the like. The prominence score of a word may correspond to a significance of the word relative to other words included in the item description. For example, the word "chair" may be assigned the highest prominence score because the word "chair" is a headword providing a basic description of the corresponding item. By contrast, the words "dining," "Walnut," and "Scandinavian" may be assigned lesser prominence scores because these words merely relate to attributes of the item.

As noted, the ontology engine 110 may query the database 130 in order to retrieve, from the database 130, one or more item descriptions matching the first item description, which may be sorted based on the relevance score of each of the matching item descriptions. The relevance score for a matching item description may correspond to a combined prominence score of the words in the item description that match a word from the first item description. Accordingly, in the example shown in FIG. 3A, the second item description may have a relevance score of 104 because the words "Scandinavian," "dining," and "chair" appear in the first item description and the second item description.

The ontology engine 110 may query the database 130 to return a certain quantity of matching item descriptions having a highest relevance score (e.g., item descriptions having the top n relevance scores). Alternatively and/or additionally, the ontology engine 110 may query the database 130 to return one or more matching item descriptions whose relevance score exceeds a threshold value. For example, the ontology engine 110 may query the database 130 to return matching item descriptions whose relevance score exceed the prominence score assigned to the headwords appearing in each item description (e.g., 100), thereby preventing the database 130 from returning item descriptions whose most significant word (e.g., headword) does not appear in the first item description. Accordingly, in some example embodiments, the ontology engine 110 may determine, based at least on a result of querying the database 130, whether the first item description "Scandinavian cherry dining chair" matches one or more item descriptions stored in the database 130. For example, the result of querying the database 130 may include (or exclude) the second item description based on whether the relevance score of the second item description exceeds the threshold value. Alternatively and/or additionally, the result of querying the database 130 may include (or exclude) the second item description based on whether the second item description include more than a threshold quantity of words that match the words included in the first item description.

In some example embodiments, if the ontology engine 110 determines that the first item description "Scandinavian cherry dining chair" matches at least the second item description "Scandinavian walnut dining chair" stored in the database, the ontology engine 110 may update the ontology of the database 130 including by associating the first item description with the headword (e.g., "chair") associated with the second item description. Alternatively, if the ontology engine 110 determines that the first item description "Scandinavian cherry dining chair" does not match any item descriptions stored in the database (e.g., the result of querying the database 130 is a NULL set), the ontology engine 110 may further determine a headword for the first item description based on one or more inputs received from the user at the second client 150b. For instance, if the one or more inputs received from the second client 150b identifies "chair" as the headword of the first item description "Scandinavian cherry dining chair," the ontology engine 110 may update the ontology of the database 130 by at least associating the first item description "Scandinavian cherry dining chair" with the headword "chair."

Referring again to FIG. 1, the search engine 120 may receive, from the second client 150b, a search phrase describing an item. In response to receiving the search phrase from the second client 150b, the search engine 120 may identify one or more item descriptions in the database 130 that match the search phrase based at least on the relevance of the matching words that appear in the search phrase and in each of a plurality of item descriptions stored in the database 130. In some example embodiments, the search engine 120 may identify the item descriptions that match the search phrase based at least on the ontology of the database 130 which, as noted, categorizes the item descriptions stored in the database 130 including by associating each item description with a headword.

Figure 3B:
FIG. 3B depicts a table illustrating an example of a search result, in accordance with some example embodiments.

In some example embodiments, the search engine 120 may respond to receiving the search phrase from second client 150b by at least querying the database 130 to retrieve, from the database 130, one or more item descriptions matching the search phrase. Each of the matching item description retrieved from the database may be associated with a relevance score corresponding to a combined prominence score of the words in the item description that match a word in the search phrase. The search engine 120 may determine that an item description matches the search phrase if the relevance score of the item description exceeds a threshold value. This threshold value may be adjusted, for example, to be equal to or greater than the prominence score assigned to headwords, thereby ensuring that the headword of an item description must appear in the search phrase in order for the item description to be selected as a matching item description. Alternatively and/or additionally, the search engine 120 may select a quantity of item descriptions having the highest relevance scores. Accordingly, even though a first item description may include a larger quantity of matching words than a second item description, the search engine may nevertheless determine that the second item description is a match for the search phrase if the second item description has a higher relevance score than the first item description. To further illustrate, FIG. 3B depicts a table 350 illustrating an example of a search result, which may include item descriptions from the database 130 that are determined to match the search phrase received from the second client 150b.

Figure 2:
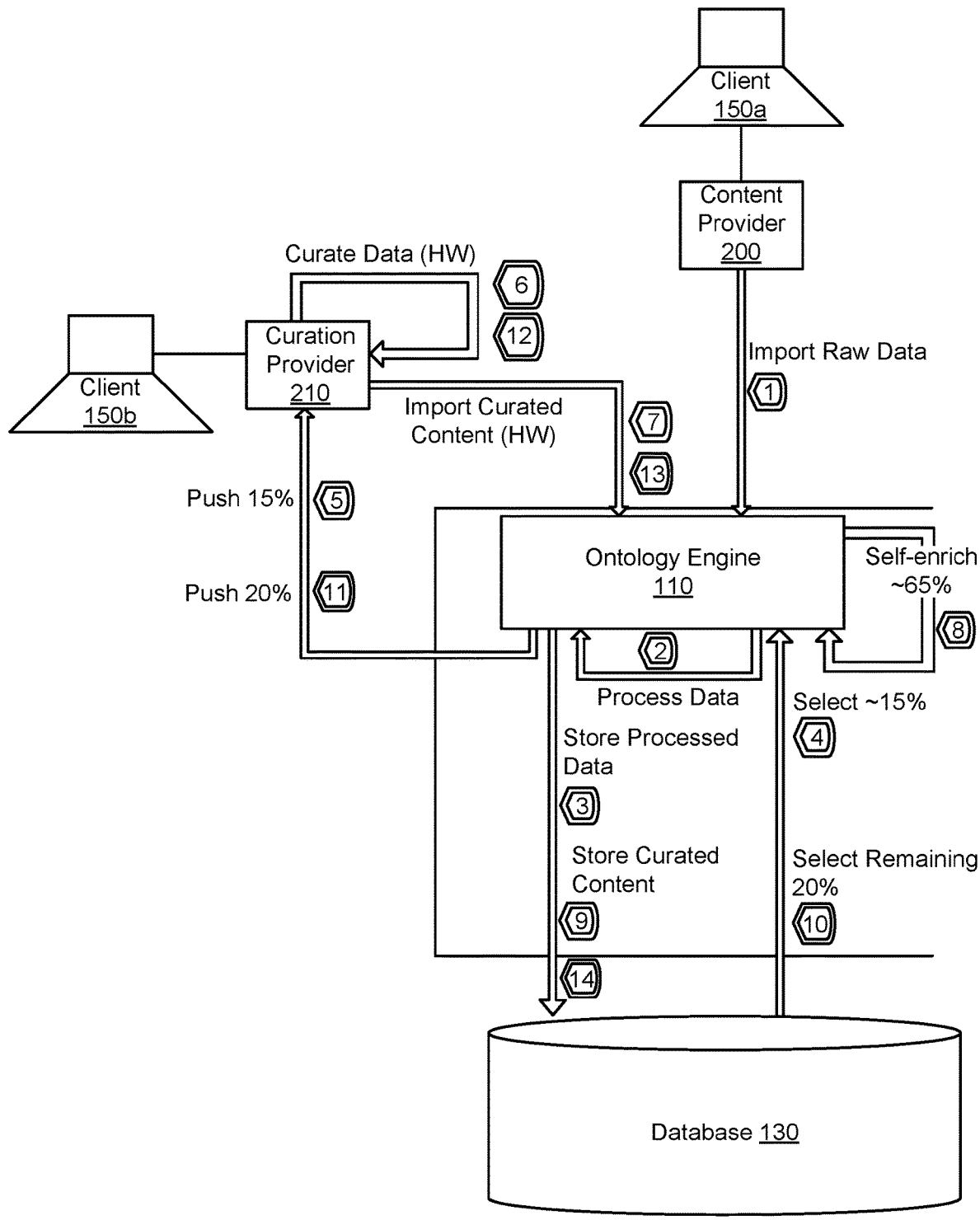
FIG. 2 depicts a block diagram an example of dataflow within a database system, in accordance with some example embodiments.

FIG. 2 depicts a block diagram illustrating an example of dataflow within the database system 100, in accordance with some example embodiments. Referring to FIGS. 1-2, the ontology engine 110 may receive, from a content provider such as the first client 150a, raw data including the first item description (e.g., "Scandinavian cherry dining chair"). The ontology engine 110 may process the first item description to at least determine whether the first item description matches at least the second item description (e.g., "Scandinavian walnut dining chair") already stored in the database 130. If the ontology engine 110 determines that the first item description received from the first client 150a matches the second item description stored in the database 130, the ontology engine 110 may store, in the database 130, the first item description including an association between the first item description and the headword (e.g., "chair") associated with the second item description.

Alternatively, the ontology engine 110 may determine that the first item description (e.g., "Scandinavian cherry dining chair") does not match any item descriptions already stored in the database 130. As such, the ontology engine 110 may send, to a curation provider 210 such as the second client 150b, the first item description. The user at the second client 150b may provide one or more inputs identifying a headword (e.g., "chair") for the first item description. Accordingly, the ontology engine 110 may store, in the database 130, the first item description including an association between the first item description (e.g., "Scandinavian cherry dining chair") and the headword (e.g., "chair") identified by the user at the second client 150b.

In some example embodiments, the ontology engine 110 may be configured to learn the ontology of the database 130 iteratively. That is, the ontology engine 110 may respond to the addition of each new item descriptions to the database 130 by at least updating the ontology of the database 130 accordingly. For example, subsequent to updating the ontology of the database 130 to reflect the addition of the second item description (e.g., "Scandinavian cherry dining chair") to the database 130, the ontology engine 110 may again update the ontology of the database 130 in order to reflect the addition of a third item description (e.g., "walnut Biedermeier office chair"), a fourth item description (e.g., "modern barstool in stainless steel"), a fifth item description (e.g., "red leather iPhone case"), and/or the like.

Figure 4:
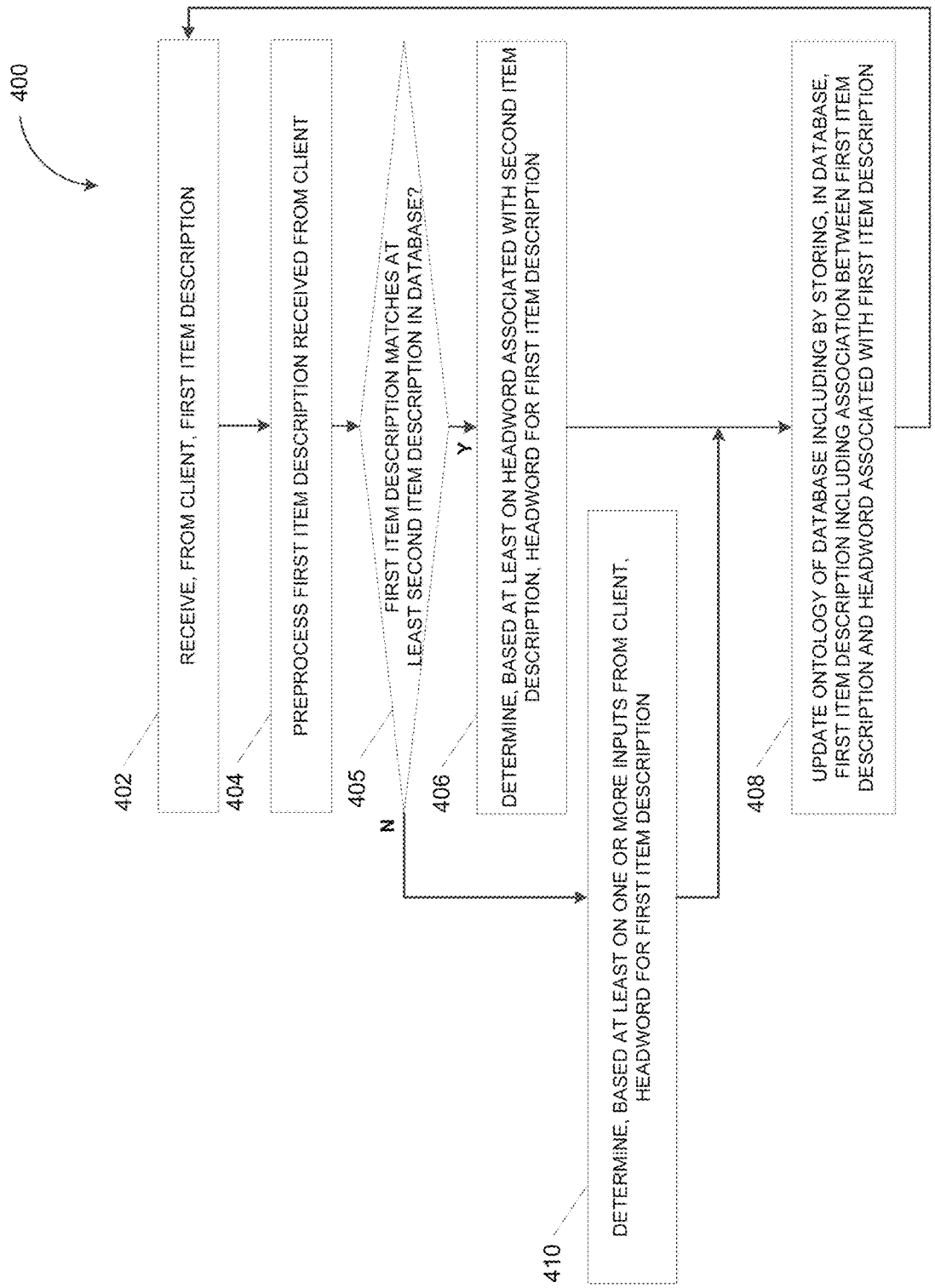
FIG. 4 depicts a flowchart illustrating a process for performing a search, in accordance with some example embodiments.

FIG. 4 depicts a flowchart illustrating a process 400 for learning an ontology of a database, in accordance with some example embodiments. Referring to FIGS. 1-4, the process 400 may be performed by the ontology engine 110 in order to learn an ontology of the database 130.

At 402, the ontology engine 110 may receive, from a client, a first item description. For example, the ontology engine 110 may receive, from the first client 150a, the first item description "Scandinavian cherry dining chair" for storage in the database 130.

At 404, the ontology engine 110 may preprocess the first item description received from the client. In some example embodiments, the ontology engine 110 may preprocess the first item description "Scandinavian cherry dining chair" including by tokenizing the first item description into individual words and cleaning the first item description, for example, to remove stop words, numerical digits, non-alphabet symbols, and/or the like. Alternatively and/or additionally, the preprocessing of the first item description may include lemmatizing the first item description to eliminate multiple variations (e.g., inflected forms and/or the like) of the same word. As noted, the preprocessing of the first item description may further include supplementing and/or replacing one or more words from the first item description with synonyms and/or hypernyms, which may be more general than the original words. The preprocessing of the first item description may also include replacing incorrect words with correct words identified, for example, by applying a distance algorithm (e.g., Levenstein distance and/or the like) to the incorrect words.

At 405, the ontology engine 110 may determine whether the first item description matches at least a second item description stored in the database 130. For example, the ontology engine 110 may determine whether the first item description "Scandinavian cherry dining chair" matches at least the second item description "Scandinavian walnut dining chair" already stored in the database 130. According to some example embodiments, each word in the second item description may be associated with a prominence score. Moreover, the second item description may be associated with a relevance score corresponding to a combined prominence scores of the words in the second item description that match a word from the first item description. For instance, as table 300 in FIG. 3A shows, the second item description may be associated with a relevance score of 104, which combines the prominence score of 100 may be assigned to the word "chair," the prominence score of 3 assigned to the word "dining," and the prominence score of 1 assigned to each of the words "walnut" and "Scandinavian." The ontology engine 110 may determine that the first item description matches the second item description if, for example, the relevance score of the second item description excludes a threshold value.

At 405-Y, the ontology engine 110 may determine that the first item description matches the second item description stored in the database 130. For example, the ontology engine 110 may determine that the first item description "Scandinavian cherry dining chair" matches the second item description "Scandinavian walnut dining chair" already stored in the database 130. At 406, the ontology engine 110 may respond to the first item description matching the second item description by at least determining, based at least on a headword associated with the second item description, a headword for the first item description. For instance, in the event the ontology engine 110 determines that the first item description "Scandinavian cherry dining chair" matches the second item description "Scandinavian walnut dining chair," the ontology engine 110 may assign, to the first item description, the same headword "chair" associated with the second item description.

At 408, the ontology engine 110 may update the ontology of the database 130 including by storing, in the database 130, the first item description including an association between the first item description and the headword associated with the first item description. For example, the ontology engine 110 may update the ontology of the database 130 by at least storing, in the database 130, the first search description "Scandinavian cherry dining chair" as well as an association between the first search description and the headword "chair" assigned to the first search description. As noted, the ontology of the database 130 may categorize the item descriptions stored in the database 130 including by associating each item description with a headword. Accordingly, the ontology of the database 130 may be updated to categorize the first item description "Scandinavian cherry dining chair" based on the headword "chair."

Alternatively, at 405-N, the ontology engine 110 may determine that the first item description does not match at least the second item description stored in the database 130. For example, the ontology engine 110 may determine that the first item description "Scandinavian cherry dining chair" does not match any of the item descriptions already stored in the database 130 if none of the item descriptions in the database 130 are associated with an above-threshold relevance score when matched to the first item description.

At 410, the ontology engine 110 may respond to the first item description not matching at least the second item description stored in the database 130 by at least determining, based at least on one or more inputs from the client, a headword for the first item description. For example, the ontology engine 110 may send, to the first client 150a (and/or the second client 150b), the first item description "Scandinavian cherry dining chair." Moreover, the ontology engine 110 may receive, from the first client 150a (and/or the second client 150b), one or more inputs identifying a headword for the first item description. For instance, the ontology engine 110 may receive, from the first client 150a (and/or the second client 150b), one or more inputs identifying "chair" as the headword for the first item description.

At 408, the ontology engine 110 may update the ontology of the database 130 by storing, in the database 130, the first item description including an association between the first item description and the headword associated with the first item description. Upon determining, based on one or more inputs from the first client 150a (and/or the second client 150b), the headword of the first search description, the process 400 may resume at operation 410 where the ontology engine 110 updates the ontology of the database 130. For example, the ontology engine 110 may update the ontology of the database 130 by at least storing, in the database 130, the first search description "Scandinavian cherry dining chair" as well as an association between the first search description and the headword "chair" assigned to the first search description. As noted, the ontology of the database 130 may categorize the item descriptions stored in the database 130 including by associating each item description with a headword. Accordingly, the ontology of the database 130 may be updated to categorize the first item description "Scandinavian cherry dining chair" based on the headword "chair."

FIG. 5 depicts a block diagram illustrating a computing system 500 consistent with implementations of the current subject matter. Referring to FIGS. 1 and 5, the computing system 500 can be used to implement the ontology engine 110, the search engine 120 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the ontology engine 110 and the search engine 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      receiving a first item description;
      determining whether the first item description matches at least a second item description stored in a database;
      in response to the first item description matching the second item description, updating an ontology of the database by at least storing, in the database, the first item description including a first association between the first item description and a first headword associated with the second item description;
      in response to the first item description not matching any item descriptions in the database, determining, based at least on one or more user inputs, a second headword for the first item description; and
      updating the ontology of the database by at least storing, in the database, the first item description including a second association between the first item description and the second headword.

2. The system of claim 1, wherein the first item description is determined to match the second item description based at least on a relevance score of the second item description, wherein the relevance score of the second item description corresponds to a prominence score of one or more words in the second item description that are also present in the first item description, and wherein the prominence score of each of the one or more words corresponds to a relative significance of each of the one or more words.

3. The system of claim 2, wherein the first item description is determined to match the second item description based at least on whether the relevance score exceeds a threshold value.

4. The system of claim 3, wherein the threshold value is equal to or greater than a prominence score of assigned to the first headword included in the second item description.

5. The system of claim 1, wherein the first headword and the second headword each comprises a word having a greatest significance by at least providing a basic description of a corresponding item.

6. The system of claim 1, wherein the database stores a plurality of item descriptions including the first item description and the second item description, and wherein the ontology of the database categorizes, based at least on the first headword and/or the second headword, the plurality of item descriptions.

7. The system of claim 1, wherein the first item description is assigned the first headword of the second item description in response to the first item description matching the second item description.

8. The system of claim 1, wherein the one or more user inputs identifies the second headword as a headword associated with the first item description.

9. The system of claim 1, further comprising:
   receiving a search phrase; and
   in response to receiving the search phrase, querying the database to retrieve, based at least on the ontology of the database, one or more item descriptions matching the search phrase, the one or more item descriptions include the first item description based at least on a first relevance score of the first item description exceeding a threshold value, and the first relevance score of the first item description corresponding to a prominence score of each of one or more words in the first item description that are also present in the search phrase.

10. The system of claim 9, wherein the one or more item descriptions further excludes the second item description based at least on a second relevance score of the second item description not exceeding the threshold value.

11. The system of claim 1, wherein the database comprises a relational database, and wherein the first item description is determined to match at least the second item description by at least querying the database.

12. The system of claim 1, wherein the first item description is preprocessed by at least eliminating variations of one or more words in the first item description.

13. The system of claim 1, wherein the first item description is preprocessed by at least replacing and/or supplementing a first word in the search phrase with a second word, and wherein the second word comprises a synonym and/or a hypernym of the first word.

14. The system of claim 1, wherein the first item description is preprocessed by at least replacing an incorrect word in the first item description with a correct word, and wherein the correct word is identified by at least applying, to the incorrect word, a distance algorithm.

15. A computer-implemented method, comprising:
receiving a first item description;
determining whether the first item description matches at least a second item description stored in a database;
in response to the first item description matching the second item description, updating an ontology of the database by at least storing, in the database, the first item description including a first association between the first item description and a first headword associated with the second item description;
in response to the first item description not matching any item descriptions in the database, determining, based at least on one or more user inputs, a second headword for the first item description; and
updating the ontology of the database by at least storing, in the database, the first item description including a second association between the first item description and the second headword.

16. The method of claim 15, wherein the first item description is determined to match the second item description based at least on a relevance score of the second item description, wherein the relevance score of the second item description corresponds to a prominence score of one or more words in the second item description that are also present in the first item description, and wherein the prominence score of each of the one or more words corresponds to a relative significance of each of the one or more words.

17. The method of claim 15, wherein the first headword and the second headword each comprises a word having a greatest significance by at least providing a basic description of a corresponding item.

18. The method of claim 15, wherein the first item description is assigned the first headword of the second item description in response to the first item description matching the second item description.

19. The method of claim 15, wherein the one or more user inputs identifies the second headword as a headword associated with the first item description.

20. A non-transitory computer readable medium storing instructions, which when executed by at least one data processor, result in operations comprising:
receiving a first item description;
determining whether the first item description matches at least a second item description stored in a database;
in response to the first item description matching the second item description, updating an ontology of the database by at least storing, in the database, the first item description including a first association between the first item description and a first headword associated with the second item description;
in response to the first item description not matching any item descriptions in the database, determining, based at least on one or more user inputs, a second headword for the first item description; and
updating the ontology of the database by at least storing, in the database, the first item description including a second association between the first item description and the second headword.

* * * * *